G. H. VIGER.
VALVE.
APPLICATION FILED APR. 17, 1914.

1,193,849.

Patented Aug. 8, 1916.

Witnesses

Inventor
G. H. Viger
His Attorney

UNITED STATES PATENT OFFICE.

GEORGE H. VIGER, OF MONTREAL, QUEBEC, CANADA.

VALVE.

1,193,849. Specification of Letters Patent. Patented Aug. 8, 1916.

Application filed April 17, 1914. Serial No. 832,584.

*To all whom it may concern:*

Be it known that I, GEORGE H. VIGER, a subject of the King of Great Britain, and resident of the city of Montreal, in the Province of Quebec and Dominion of Canada, have invented certain new and useful Improvements in Valves, of which the following is a full, clear, and exact description.

This invention relates to improvements in valves, and the object is to provide a valve of simple and durable construction which may be manufactured and sold at a minimum cost.

A further object is to provide a valve having the seat thereof so formed that great accuracy of finish is not so necessary to form a fluid tight joint as is the case with ordinary valves.

Another object is to provide a valve, the seat of which may be readily refinished with ordinary tools, and which in use will not be cut as quickly as the ordinary valve seat.

The valve consists essentially of a body of any suitable shape having the usual internal division wall in which the seat is formed. The seat is stepped, so that it is in reality a plurality of seats. The closure member is correspondingly stepped, and is provided with suitable centering means, so that it will descend accurately on the seat.

Figure 1:
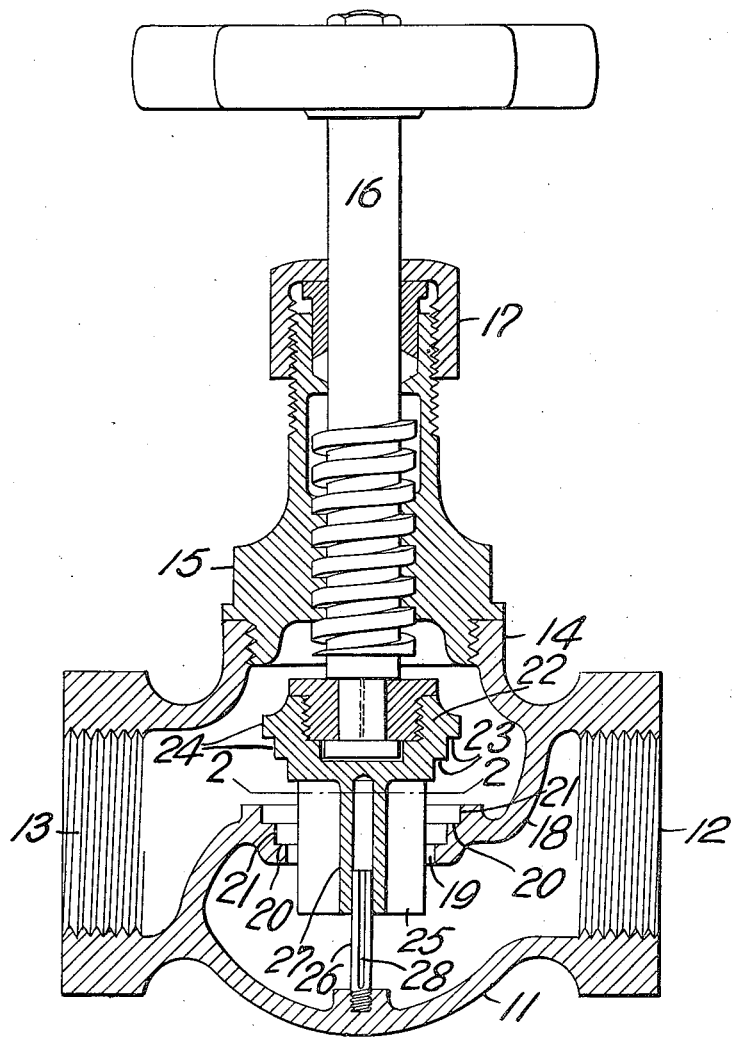
Figure 2:
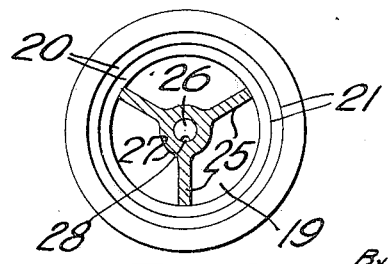

In the drawings which illustrate the invention:—Figure 1 is a vertical longitudinal section of a straight globe valve formed according to this invention. Fig. 2 is a horizontal section on the line 2—2, Fig. 1.

Referring more particularly to the drawings, 11 designates the valve body having inlet and outlet passages 12 and 13 respectively, and a neck 14, to which a bonnet 15 of any suitable form is secured. The screw threaded valve stem 16 operates through this bonnet in the usual manner, and is provided with a suitable stuffing box 17 to prevent leakage. Within the body a division wall 18 is provided in the usual manner containing a port 19, which is the only communication between the inlet and outlet passages of the valve. The seat 20 surrounding this port, instead of being conical as in the majority of valves, is flat and surrounded by a flange 21, the inner walls of which are perpendicular to the seat, as clearly shown. The seat may be formed entirely in one plane or may be in several planes, as shown in the drawings, forming a stepped seat. The closure member 22 is formed to correspond exactly with the seat, having flat portions 23 adapted to engage the seat 20 and cylindrical portions 24 adapted to fit snugly within the cylindrical walls 21 around the seat. In order to insure the closure member descending accurately on the seat, the lower surface thereof is provided with a plurality of depending wings 25, which at their outer edges bear snugly against the wall of the port 19 and maintain the closure member accurately centered. The body of the valve may also if desired be provided with a guide or pin 26 operating in a hollow post 27, depending from the closure member and serving the same purpose as the wings 25. This post may be provided with a longitudinal groove 28 for the entrance and escape of air.

The form of seat shown and described is much easier and less expensive to manufacture than the ordinary conical seat, and has the advantages of forming a tighter joint with the valve and being free from cutting. The cone shape of the ordinary valve closure member tends to grind in any new particles of grit and cut the seat much more rapidly, and in addition the flow of steam is directly over the conical seat and closure member, whereas in the present form, the flow is past the seat so that the steam or other fluid will have practically no cutting effect on the seats. The multiplicity of seats and the snug fit between the cylindrical surfaces of the closure member and division wall form a very perfect joint. Seats of this character may be refinished with ordinary tools, and may also be refinished a greater number of times than the conical seats, so that the valve in addition to being cheaper to manufacture is cheaper to maintain and more efficient. While the seat has been shown in two steps, it is obvious that only one or any number of steps may be used. It is also obvious that both the wings and guide post are not essential, but that either may be used as desired.

Having thus described my invention, what I claim is:—

In a valve, a body having inlet and outlet passages, an apertured wall separating the inlet and outlet, a seat surrounding said wall aperture, a closure member adapted to make a fluid tight joint with the seat and means for guiding said member to its seat comprising the combination of a plurality of depending wings on said closure member and a slotted telescopic guide between the closure member and the valve body, the slot adapted to permit the escape of air.

In witness whereof, I have hereunto set my hand in the presence of two witnesses.

GEORGE H. VIGER.

Witnesses:
S. R. W. ALLEN,
G. M. MORELAND.